United States Patent [19]

Schaevitz

[11] 4,221,054
[45] Sep. 9, 1980

[54] MULTI-PIECE PNEUMATIC TIRE RIM COMPONENT COMPARISON PLATES

[76] Inventor: Lester P. Schaevitz, Llanalew No. 10, 100 Llanalew Rd., Haverford, Pa. 19041

[21] Appl. No.: 29,611

[22] Filed: Apr. 13, 1979

[51] Int. Cl.² .............................................. G01B 3/14
[52] U.S. Cl. ................................. 33/174 G; 33/203
[58] Field of Search ............ 33/174 R, 174 G, 174 P, 33/174 PB, 203

[56] References Cited
U.S. PATENT DOCUMENTS

| 781,960 | 2/1905 | Marbach | 33/174 G |
| 794,031 | 7/1905 | Lehman | 33/203 |
| 2,369,960 | 2/1945 | Gage et al. | 33/174 G |
| 2,755,587 | 7/1956 | Hirst | 33/174 G |

FOREIGN PATENT DOCUMENTS 109876 12/1943 Sweden ................................. 33/174 G Primary Examiner—Richard R. Stearns
Attorney, Agent, or Firm—Paul & Paul

[57] ABSTRACT

A comparison plate has an irregularly shaped hole which is used for comparison and matching with the cross-sectional size and configuration of the free end of the split-lock ring component of a multi-piece tire rim. The comparison plate for a two-piece rim has, at a portion of its peripheral edge, a contoured edge used for comparison and matching with the annular gutter and peripheral lip portion of the rim base of the multi-piece tire rim to determine whether the rim base and split-ring are mating components of the same multi-piece rim. The comparison plate for a three-piece tire rim also has, at an additional or second portion of its peripheral edge, a second contoured portion for matching and mating with the contoured surface of the non-split annular side ring.

8 Claims, 11 Drawing Figures

MULTI-PIECE PNEUMATIC TIRE RIM COMPONENT COMPARISON PLATES

BACKGROUND OF THE INVENTION

This invention relates to pneumatic tire rims, and particularly to light commercial and truck tire rims.

Most passenger car tires today are of the tubeless type. This is not true or light commercial and truck tires. A majority of light commercial and truck tires are of the tube type.

It would be difficult to mount a tire of the tube type on a one-piece rim because it would be difficult to get the tire with its inner tube and protective flap over the outer flange of a one-piece rim. Because of this difficulty, rims for tube type tires are multi-piece, being either two-piece or three-piece.

The two-piece rim has a rim base and a detachable split flange which is frequently referred to as a lock ring. The rim base is annular, comprising a relatively wide flat annular surface having at the inner edge thereof an integral raised flange. At the outer edge of the rim is a gutter having an inner edge defined by a relatively small jog or step down from the larger diameter annular surface of the main annular surface of the rim base. At the outer edge of the gutter is a low flange or lip.

The split flange or split lock ring in the two-piece rim is an annular member which is interrupted or slit in the transverse direction. The lower or inner-diameter surface of the split lock ring has a contour which is shaped to mate with the contour of the surface of the gutter and outer lip of the rim so that the split lock ring may be placed over the lip of the gutter and locked into place against the lip.

When a tube type tire is to be mounted on the two-piece rim, as by a maintenance or repair man in a tire repair or recapping shop, the rim base is placed on the floor with the inner flange of the rim resting on the floor, i.e., with the center axis of the annular rim vertical. The tire containing an inner tube and flap are then dropped over the annular rim base. The inner sidewall and bead of the tire now rest against the inner flange of the rim base. The outer sidewall and bead of the tire have also passed over the outer lip of the rim base and are inside the lip of the rim base. The second piece of the two-piece rim, i.e., the split flange or split ring, is now placed against the outer sidewall of the tire just above the outer bead, and the split ring is pushed or knocked downwardly (inwardly relative to the tire when mounted on the wheel), as by a hammer or other appropriate tool, until the split lock ring snaps into place. In this position, upon inflation of the tire, the split lock ring becomes, or should become, "locked" and able to withstand the outward forces to which it will be subjected by the high air pressure (85–90 lbs) in the tire when cold, and to the substantially higher tire pressures and outward forces to which the tire will be subjected when the tire is in use under hot road conditions.

The three-piece rim has a rim base (generally similar to that of a two-piece rim), an integral (non-split) annular side ring, and a split lock ring. The split lock ring has an outer lip. It interfits between the rim base and the annular side ring. The split lock ring is contoured on its inside-diameter surface to mate with the gutter and outer lip of the rim base. The other side of the split lock ring is contoured to mate with the annular non-split side ring.

To mount the truck tire, as in a repair or recapping shop, the first piece of the three-piece rim, i.e., the rim base is placed on the floor with its inner flange resting on the floor and the center axis of the annular rim vertical. The tire, containing inner tube and flap, is then dropped over the annulus of the rim base, and the tire takes a position similar to that described above with respect to the two-piece rim. The non-split annular side ring is next placed over the outer lip of the rim base gutter and against the outer sidewall of the tire. Lastly, the split lock ring is inserted over the lip of the gutter and positioned between the inside diameter of the non-split annular side ring and the gutter and lip of the rim base. When the truck tire is inflated, the inside diameter surface of the split lock ring mates, or should mate, with the gutter and outer lip of the rim base while the outside surface and lip of the split lock ring mates, or should mate, with the non-split annular side ring.

Tires are usually repaired or recapped in a shop or other building in which more than one repairman or worker is working and more than one tire is being repaired or recapped. As a consequence, the various parts of different multi-piece rims may be scatterred around the floor and it may easily happen that a split ring of a particular make or type of two-piece rim may be picked up by a worker and assembled with a rim base which is not its mate. Or, the split ring of a three-piece rim may be picked up and assembled with a rim base and/or a side ring which are not its intended mates.

Multi-piece rims are made by several different manufacturers, and while the rim pieces of different manufacturers may appear to be generally similar in size and shape as compared to those of other manufacturers, the parts in fact are not identical, and the differences therebetween, although appearing to be small, may be enough to prevent a lock ring of one manufacturer from mating "lockingly" with the rim base of another manufacturer, or of another type of the same manufacturer. In such cases, when the tire is inflated to a pressure, for example, of 90 lbs., the split lock ring may fly out with explosive force. Serious injury has occurred to repairmen or other workers as a result of such explosive separation of rim parts caused by incorrect matching of parts of multi-piece rims.

An explosive separation of parts of multi-piece rims may also occur on the streets or highway when a lock-ring dislodges due to incorrect matching of parts. In such cases, the split ring and/or side ring may fly across the highway and smash into a passing vehicle or pedestrian with very serious consequences.

SUMMARY OF THE INVENTION

The problem described above may be substantially alleviated by the present invention.

According to the present invention, a pattern or templet is provided which functions as a matching device to confirm that the two or more component parts of a multi-piece rim are matching or mating components. Such pattern or templet is made or rigid material, preferably metal, and preferably aluminum, and for convenience will be referred to in this application as a comparison plate since its function is to compare a rim component with a shape or contour found on the plate. A different comparison plate is provided for each different size, type, and manufacture of multi-piece tire rims. Each comparison plate contains an irregularly shaped hole having a size and configuration corresponding to the size and configuration of the cross section of the split component of a multi-piece tire rim. In addition, the comparison plate, along one of its edges, has a contour corresponding to the size and contour of that part of the outer portion of the rim base which contains the gutter and lip. In the case of a three-piece tire rim, the comparison plate, in addition to the hole and the first contoured surface, has a second contoured surface corresponding to the size and contour of that portion of the non-split side ring which mates with the upper surface and lip of the split lock ring. Each comparison plate is preferably identified by an appropriate identifying number, or letter, or other indicia, and may preferably have a circular hole in the corner area through which a "key" chain may be passed, so that a complete set of comparison plates may be kept together for ready selection and use.

DETAILED DESCRIPTION OF THE PREFERRED EMBODIMENTS

Figure 1:
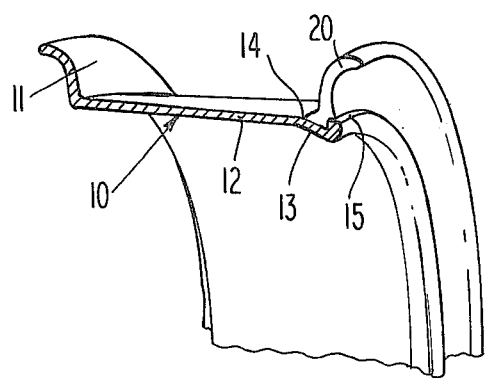
FIG. 1 is a fragmentary perspective view, in section, of a two-piece tire rim.

Referring now to FIG. 1, this figure is a fragmentary perspective illustration, in section, of a two-piece tire rim having an annular rim base 10 and a split annular side ring or split lock ring 20. The view in FIG. 1 is taken through the slit in the split lock ring 20. Thus, the end of the split ring is not sectioned.

At its outer portion, rim base 10 has an annular gutter 13 having a low raised annular peripheral flange or lip 15. The inner edge of gutter 13 is defined by a low annular shoulder or jog 14.

For split lock ring 20 of FIG. 1 to be effectively locked in place, the size and shape or contour of the inside diametral portion of lock ring 20 must match and mate with the surface of gutter 13, lip 15, and jog 14.

Figure 2:
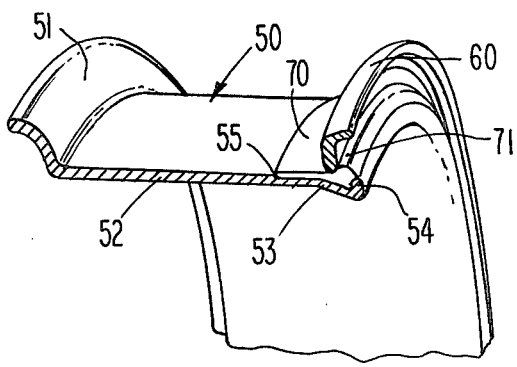
FIG. 2 is a fragmentary perspective view, in section, of a three-piece tire rim.

FIG. 2 is a fragmentary perspective view, in section, of a three-piece tire rim having an annular base rim 50, an annular side ring 60 (not split) and an annular split lock ring 70. The split lock ring 70 has a raised annular flange or lip 71 and is interfitted between side ring 60 and rim base 50 at the outer portion of the rim base.

As in the case of the two-piece tire rim, rim base 50 of the three-piece tire rim is provided at its outer edge portion with an annular gutter 53 having an annular peripheral flange or lip 54. The inner annular edge of gutter 53 is defined by a low shoulder or jog 55.

For split lock ring 70 of FIG. 2 to be effective as a locking component, the size and shape or contour of its undersurface, i.e., its inner diameter surface, must match and mate with the surface of gutter 53, lip 54, and jog 55, while the upper surface, i.e., the outer diameter surface of split lock ring 70, at the lip 71, must match and mate with the inside diametral surface of the non-split side ring 60.

Figure 3:
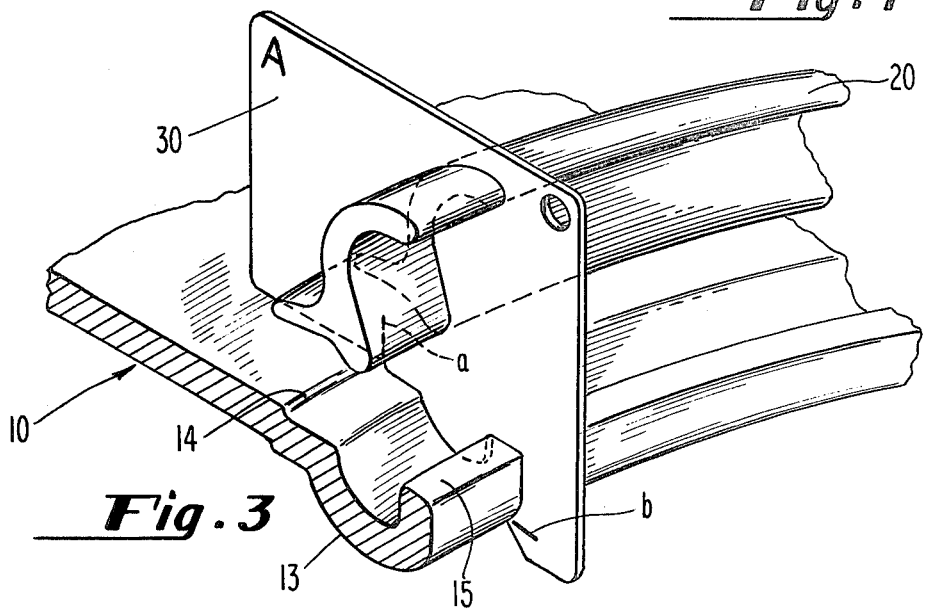
FIG. 3 is a fragmentary perspective view illustrating a comparison plate of the present invention being used to compare the contours of the rim base and split ring to determine whether they mate and match with each other.
Figure 4:
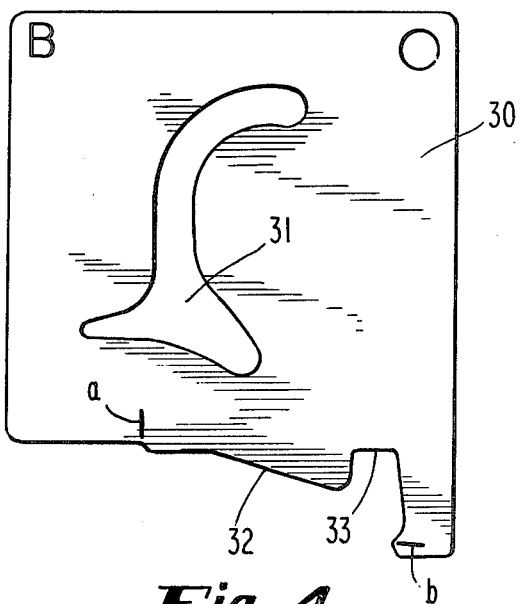
FIGS. 4 through 8 are illustrations of a variety of comparison plates for use with two-piece tire rims.
Figure 5:
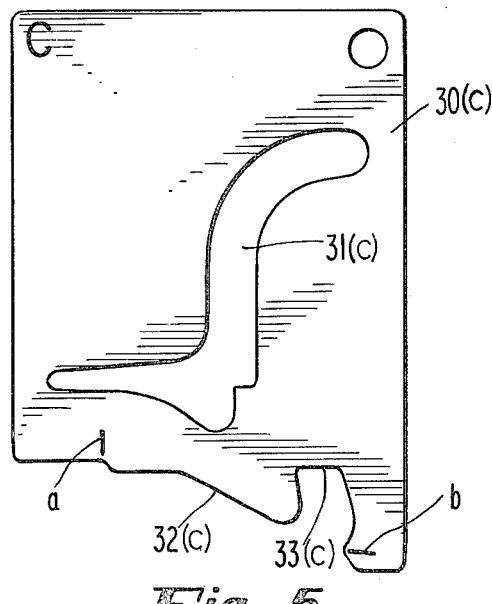
Figure 6:
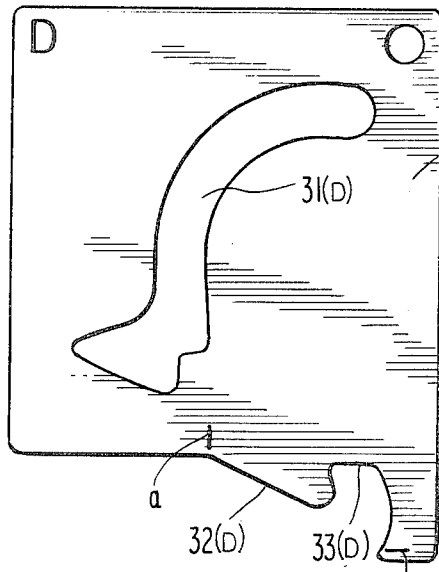
Figure 7:
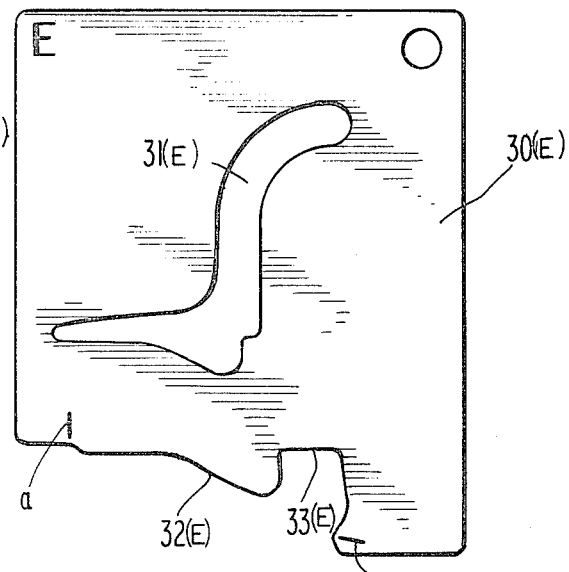
Figure 8:
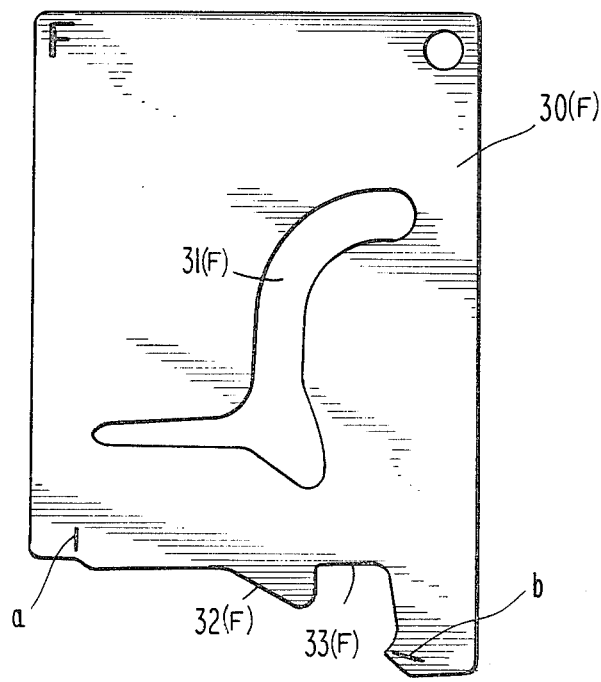

FIG. 3 illustrates a comparison plate 30, provided in accordance with the present invention, for comparing the size, shape and contour of each of the pieces of a two-piece tire rim to test and make certain that they match and mate with each other.

FIGS. 4-8 illustrate a variety of comparison plates 30 for two-piece tire rims. Each is different and, in practice, will bear an identification number, which, for the purposes of this patent application, is indicated merely by the letters A through F. Illustrations do not exclude comparison plates having other contours.

The comparison plates 30 should be made of rigid material, preferably a metal stamping, such as of aluminum or steel, but may be made of hard plastic or other suitable material. Each comparison plate 30 contains an irregularly shaped hole 31 the size and configuration of which matches exactly with the size and configuration of the cross section of a split ring 20 which is intended to match and mate with a rim base 10 having a surface contour at gutter 13, jog 14 and lip 15 which matches the contour defined on the edge 32 of comparison plate 30 between the limit points a and b. On the comparison plate 30, the recess 33 should mate with the lip 15 of the rim base.

In FIG. 3, the comparison plate 30 is shown interfitted with rim base 10 and split ring 20. It is not essential, however, that the repairman match both pieces simultaneously. It would ordinarily be more convenient for the repairman to make the matching comparisons separately. For example, the repairman would first place the tire with its inner tube and flap on rim base 10. He would then place comparison plate 30 onto the outer edge portion of rim base 10 to assure himself that he has an interfitting match and that he has correctly identified the type of rim base on which he has placed the tire. He would then remove comparison plate 30 from its interfitting engagement on rim base 10 and he would slip the hole 31 of comparison plate 30 over the free end of the split ring 20 and observe carefully to make sure that the split ring 20 completely fills the hole 31. In other words, he would make sure that the configuration of the cross section of split ring 20 corresponds exactly with the size and shape of hole 31. Having done this, he would immediately place split ring 20 onto rim base 10 and, with the use of a hammer or other suitable tool, would knock the split ring 20 into gutter 13 until split ring 20 snaps securely into place in gutter 13 and against the lip 15.

As indicated previously, FIGS. 4 through 8 illustrate comparison plates 30 having various sizes and configurations of hole 31 and various contours of edge 32 and recess 33 for various types and manufacture of two-piece tire rims. These plates 30 will, in practice, bear identifying indicia which, for convenience, is illustrated by the letters A-F. On each plate 30, the portion of edge 32,33 which is significant and important in the matching procedure is between the limits identified by the hash marks a and b. These marks will appear on the plate 30 and be visible to the repairman.

Figure 9:
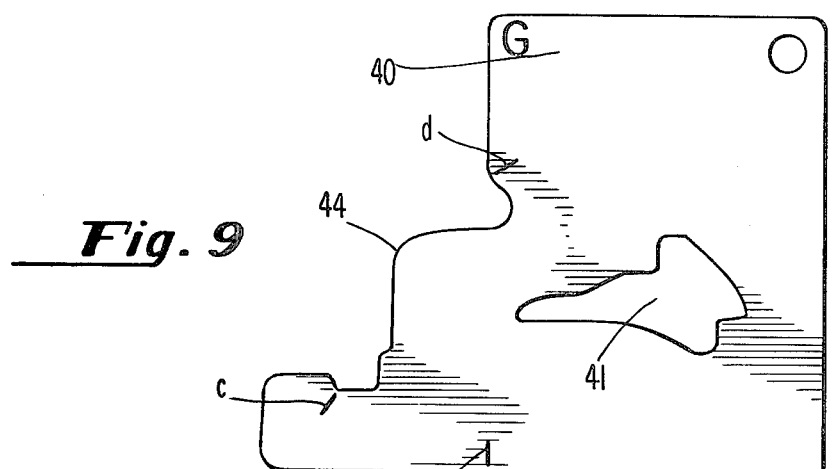
FIGS. 9-11 are illustrations of a variety of comparison plates for use with three-piece tire rims.
Figure 10:
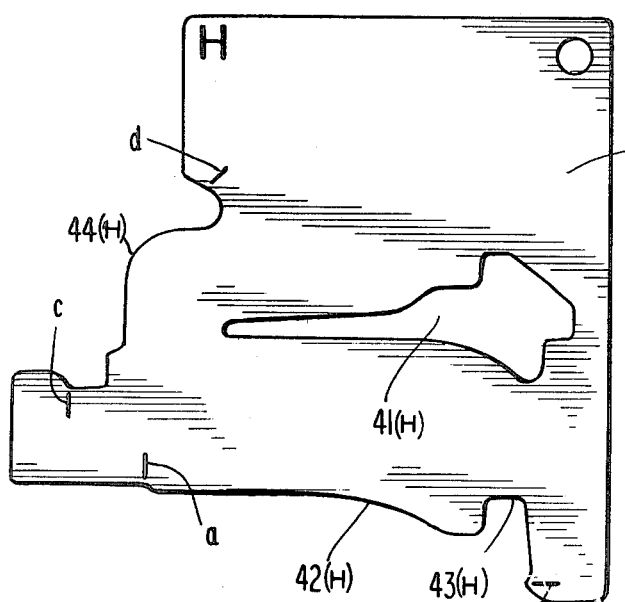
Figure 11:
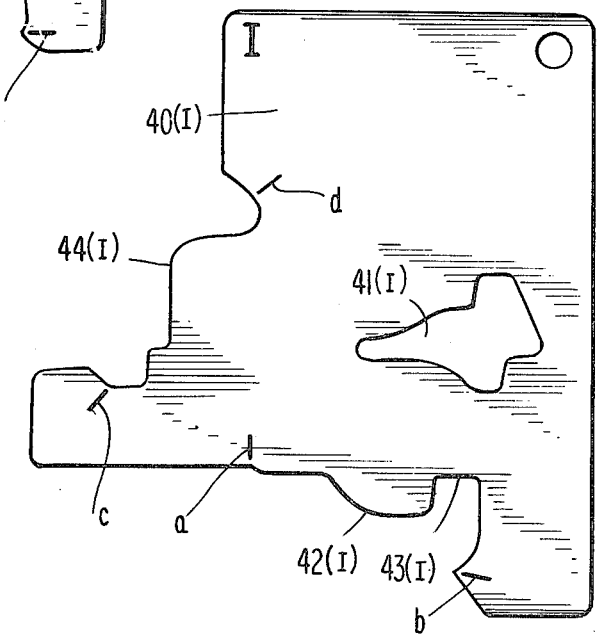

FIGS. 9-11 illustrate several different comparison plates 40 which are intended for use when the repairman is reassembling a three-piece tire rim. The comparison plate 40 differs from the comparison plate 30 which has been described above and which is used by the repairman in reassembling a two-piece tire rim.

Comparison plate 40 is provided with an opening 41 whose size and configuration are used to match and mate with that of split lock ring 70, illustrated in FIG. 2. In FIG. 2, as in FIG. 1, the view is taken through the slit of the split lock ring 70. Thus, the free end of split lock ring 70 seen in FIG. 2 is not cross sectioned.

Referring again to FIGS. 9–11, comparison plate 40 includes along one peripheral edge of the plate a contoured portion 42 which includes a recessed portion 43. The significant and important portion of edge 42,43, so far as the matching procedure is concerned, is that which lies between the limit marks appearing visibly on the plate identified a and b.

The contour of edge 42,43 lying between limits a and b should match and mate with the surface of gutter 53, peripheral lip 54, and jog 55 of the base rim 50. Included at the peripheral edge of comparison plate 40 is a second contoured edge 44. The significant and important portions of edge 44 lie between the limit marks c and d. The contour of edge 44 should match and mate with the outer surface of the annular non-split side ring 60 of FIG. 2. The portion of contoured edge 44 closest to the limit marks c is most important. This portion should match and mate with the surface of the side ring 60 which is intended to abut against the peripheral lip 71 of the split lock ring.

In mounting a repaired, or recapped, or new tire onto a three-piece truck tire rim, the repairman would first place rim base 50 on the floor with inner flange 51 resting on the floor and the center axis of the annulus 52 vertical. He would then place the tire, with its inner tube and flap, over annulus 52. The inner sidewall and bead of the tire would then rest against inner flange 51 of the rim base 50. The outer sidewall and bead of the tire would be below (inside) gutter 53, peripheral lip 54 and jog 55. The repairman would next select one of the comparison plates 40 and place the contoured edge 42,43 onto the rim base at gutter 53, lip 54 and jog 55, to assure himself that he had correctly identified the type and make of rim base 50. He would then take a side ring 60 and, using the same comparison plate 40, compare the contoured edge 44 with side ring 60 to make sure that he had selected a side ring which was one piece of the three-piece assembly he was putting together. Having done this, he would drop side ring 60 over annulus 52 and onto the outer sidewall of the tire. He would then take a split lock ring 70 and, using the same comparison plate 40, he would insert, or at least attempt to insert the free end of split lock ring 70 into hole 41 to assure himself that he had selected the proper lock ring 70. Having done this, he would interfit split lock ring 70 between side ring 60 and rim base 50 so that when the tire was inflated the split lock ring 70 and side ring 60 would be forced into the locked positions illustrated in FIG. 2.

It will be seen that in the three-piece tire rim, three pieces must be carefully matched, mated and interfitted. If, for example, side ring 60 does not mate with split lock ring 70, lip 71 may not be able to contain side ring 60 when the tire rim assembly is subjected to high pressure and side ring 60 may fly out with explosive force, with the potential of causing serious damage and injury. Or, if split lock ring 70 does not match and mate with rim base 50, peripheral lip 54 may be unable to contain the split lock ring when the tire rim assembly is subjected to high pressure, in which case split lock ring 70 may fly out either alone or followed by side ring 60, and serious damage and injury may result.

Use of comparison plates 30 and 40 by the repairman when assembling a multi-piece tire rim will avoid, or at least substantially reduce, the separation explosions which have occurred in the past.

What is claimed is:

1. A comparison plate for matching separate components of a multi-piece tire rim, one component of which is a split ring, said plate having at least two separate contoured edge surfaces, at least one of said contoured edge surfaces comprising the entire peripheral edge of an irregularly shaped hole through said plate into which the free end of said split ring is inserted for matching comparison of the size and configuration of the cross section of said split ring, and at least one of said contoured edge surfaces comprising a portion of the peripheral edge of said plate for matching comparison with an annular non-split component of said rim.

2. A comparison plate according to claim 1 wherein said plate has three separate contoured edge surfaces, one of which is said peripheral edge surface of said hole and two of which are peripheral edge surfaces of said plate for matching comparison of three separate components of a three-piece tire rim.

3. A comparison plate according to claim 2 wherein one of the annular non-split rim components has an annular lip and one of said contoured peripheral edge surfaces of said plate includes a recess for matching with said annular lip of said non-split rim component.

4. A comparison plate according to claim 3 wherein limit marks are provided on the surface of said plate for indicating the limits of at least one of said contoured edge surfaces.

5. A comparison plate according to claim 2 wherein limit marks are provided on the surface of said plate for indicating the limits of at least one of said contoured edge surfaces.

6. A comparison plate according to claim 1 wherein said annular non-split rim component has an annular lip and said contoured peripheral edge portion of said plate includes a recess for matching with said annular lip of said non-split rim component.

7. A comparison plate according to claim 6 wherein limit marks are provided on the surface of said plate for indicating the limits of at least one of said contoured edge surfaces.

8. A comparison plate according to claim 1 wherein limit marks are provided on the surface of said plate for indicating the limits of at least one of said contoured edge surfaces.

* * * * *